UNITED STATES PATENT OFFICE.

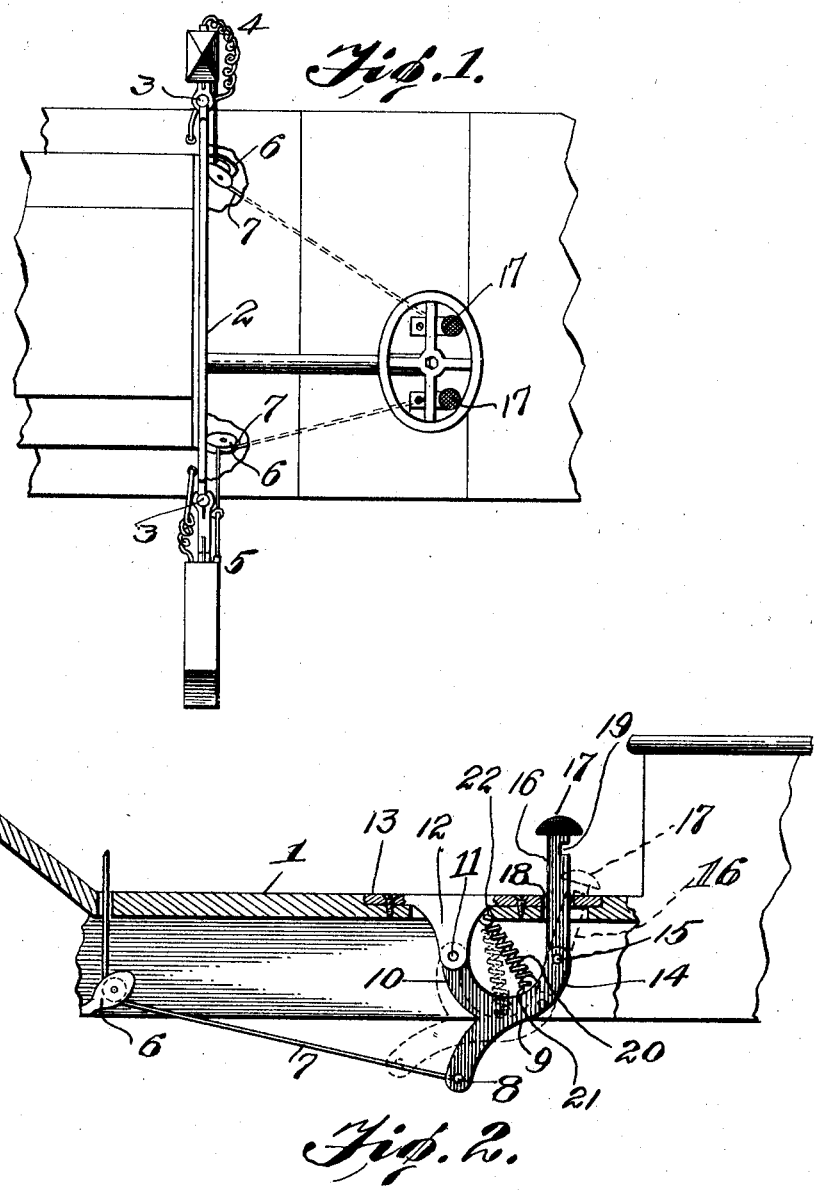

HELENA HANNAH BANKS, OF AMES, IOWA.

OPERATING MECHANISM FOR SIGNALS.

1,332,098.
Specification of Letters Patent.
Patented Feb. 24, 1920.

Application filed February 28, 1919. Serial No. 279,748.

*To all whom it may concern:*

Be it known that I, HELENA H. BANKS, a citizen of the United States, residing at Ames, in the county of Story and State of Iowa, have invented certain new and useful Improvements in Operating Mechanism for Signals, of which the following is a specification, reference being had therein to the accompanying drawings.

This invention relates to a foot operating device for signals, and has for its object the construction of a novel and an efficient device that is operated by the foot for manipulating a signal on a motor vehicle.

This application covers divisional subject matter contained in my original United States application relating to a "direction indicator," Serial No. 245,351, allowed November 11th, 1918.

With the foregoing object in view, my invention comprises certain novel constructions and combinations of parts as will be hereinafter specifically described, illustrated in the accompanying drawing, and more particularly pointed out in the appended claims.

In the drawing:

Figure 1 is a top plan view of a pair of devices constructed in accordance with my invention.

Fig. 2 is a fragmentary sectional view of a motor vehicle showing my device in elevation.

Referring to the drawing by numerals, 1 designates the floor of a motor vehicle and 2 the dash thereof. Attached to the dash at 3 are suitable, hingedly-mounted, electrical signals 4 and 5, the detail construction of which is described in my prior allowed application hereinbefore referred to; consequently, it is not necessary to describe the signal specifically in this application as reference can be had to the prior case. Contiguous to each signal is preferably positioned a pulley 6, around which passes the connecting means or cable 7, and this cable 7 is connected at 8 to the lower end or leg of the Y-shaped lever 9. The inner prong 10 of the lever 9 is pivotally connected at 11 to the depending lug 12 of the plate 13. The outer prong 14, of lever 9, is pivotally connected at 15 to the vertically-movable link 16; link 16 has a tread portion 17 formed on its upper end. The link 16 works in a slot 18 formed in the plate 13. The link 16 is provided at 19 with a notch into which fits a portion of the plate 13, when the link 16 is in the open position shown by dotted lines in Fig. 2. When the link 16 is in the open position, the signal, as signal 5 (Fig. 1), will be in its extended or "open" position, indicating to the pedestrian or traffic officer that the operator of the motor vehicle is intending to turn to the left. Upon the operator releasing the link 16 from the plate 13, by disengaging the notched portion 19 of the link from the plate the coil spring 20 will pull the lever to its normal position (Fig. 2), thereby raising the signal to its normal vertical position, as signal 4, Fig. 1. On each motor vehicle, I preferably employ two of my devices, one to operate each signal; but I have described only one as each device is similar in construction.

On the outer prong 14 is formed an integral lug 21 to which is attached the lower end of the coil spring 20, and on the primary depending lug 12 is formed an auxiliary lug 22 to which is attached the upper end of the coil spring 20 (Fig. 2). The strength of the coil spring 20 is sufficient to keep the signal in its normal vertical position, but upon the operator depressing the link 16 the signal will be permitted to swing outwardly to its horizontal position for indicating the intention of the driver to turn the vehicle.

What I claim is:

1. In a device of the class described, the combination with a support, a signal movably mounted upon said support, of a plate carried by said support, a substantially Y-shaped lever entirely below said plate and being pivotally connected at the upper end of one of its prongs to the under face of the plate, a spring between the prongs of the Y-shaped lever and connected at one end to a portion of the plate and connected at its other end to a prong of said lever, said prongs of the lever protecting the spring against injury, a vertically-movable link extending through said support and plate and connected at its lower end to a prong of the lever, and means connecting the depending portion of the lever to the signal, whereby when the link is moved vertically upon the support, causing the lever to swing upon the plate, the signal will be operated.

2. In a device of the class described, the combination with a support, a signal movably mounted upon said support, of an actuating device for said signal comprising a plate provided with a primary depending lug on its under face, an auxiliary depending lug attached to said primary lug, said plate provided with an aperture, a Y-shaped lever having its upper inner prong pivotally connected to the primary lug, said lever having an outer prong provided with an integral lug, a spring connected to the last mentioned lug and to the auxiliary lug on the primary lug, a vertically-movable link in the aperture of the plate and being pivotally connected at its lower end to the outer prong of the lever, said link provided with a notched portion to engage the plate for locking the lever in an adjusted position against the action of the spring, and connecting means fastened to the lower end of the leg of the lever and also attached to the signal whereby the operation of the link and lever will cause adjustment of the signal.

In testimony whereof I hereunto affix my signature.

HELENA HANNAH BANKS.